United States Patent [19]
Baskin

[11] 3,874,815
[45] Apr. 1, 1975

[54] ROTARY HEAD ASSEMBLY FOR ROTARY WING AIRCRAFT

[75] Inventor: Joseph M. Baskin, Bala Cynwyd, Pa.

[73] Assignee: The Boeing Company, Seattle, Wash.

[22] Filed: Nov. 15, 1973

[21] Appl. No.: 416,153

[52] U.S. Cl............... 416/134, 244/17.25, 416/141
[51] Int. Cl. ............................................ B64c 27/38
[58] Field of Search........... 244/17.25, 17.27, 17.11, 244/17.13; 416/134, 135, 141, 114, 226, 102, 138, 148

[56] References Cited
UNITED STATES PATENTS

| | | | |
|---|---|---|---|
| 3,384,185 | 5/1968 | Fernandez.................... | 416/141 UX |
| 3,669,566 | 6/1972 | Bourquardez et al. ............ | 416/134 |
| 3,762,834 | 10/1973 | Bourquardez et al. ............ | 416/134 |

FOREIGN PATENTS OR APPLICATIONS

| | | | |
|---|---|---|---|
| 1,205,757 | 9/1970 | United Kingdom............. | 244/17.25 |
| 247,395 | 5/1912 | Germany........................... | 244/135 |
| 1,189,136 | 4/1970 | United Kingdom................. | 416/141 |
| 1,192,427 | 5/1970 | United Kingdom............. | 244/17.11 |

*Primary Examiner*—George E. A. Halvosa
*Assistant Examiner*—Paul E. Sauberer
*Attorney, Agent, or Firm*—Joseph M. Corr; Robert S. Lipton; Frederic W. Neitzke

[57] ABSTRACT

A rotor head assembly for rotary wing aircraft in which opposing blades are interconnected by an integral, flexible strap mounted on a hub by spaced clamping members extending transverse to the longitudinal axes of the blades. The clamping members preferably have a degree of torsional flexibility so as to absorb bending moments, permitting the strap and clamping members to twist about their transverse axes in response to flapping movements of the blades. This eliminates the need for bearings or "shoes" on the hub for supporting the blades. At the same time, by virtue of the spaced clamping members, a degree of bending in the flexible strap will occur between the points at which the blade is clamped to optimize the flapwise bending momemt distribution along the strap.

7 Claims, 10 Drawing Figures

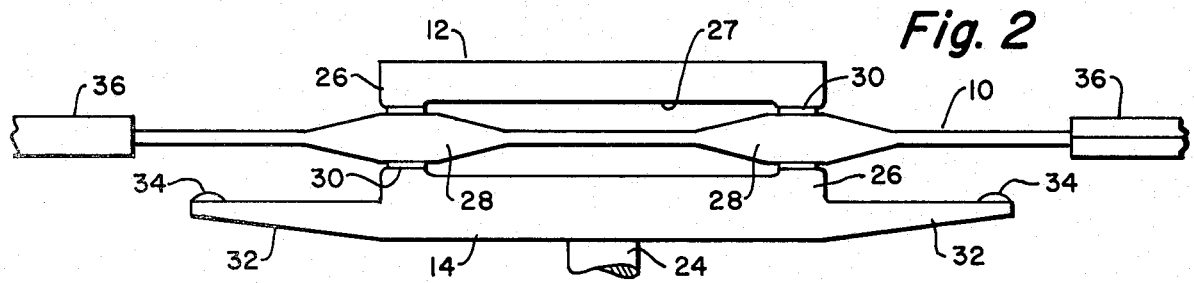
Fig. 2
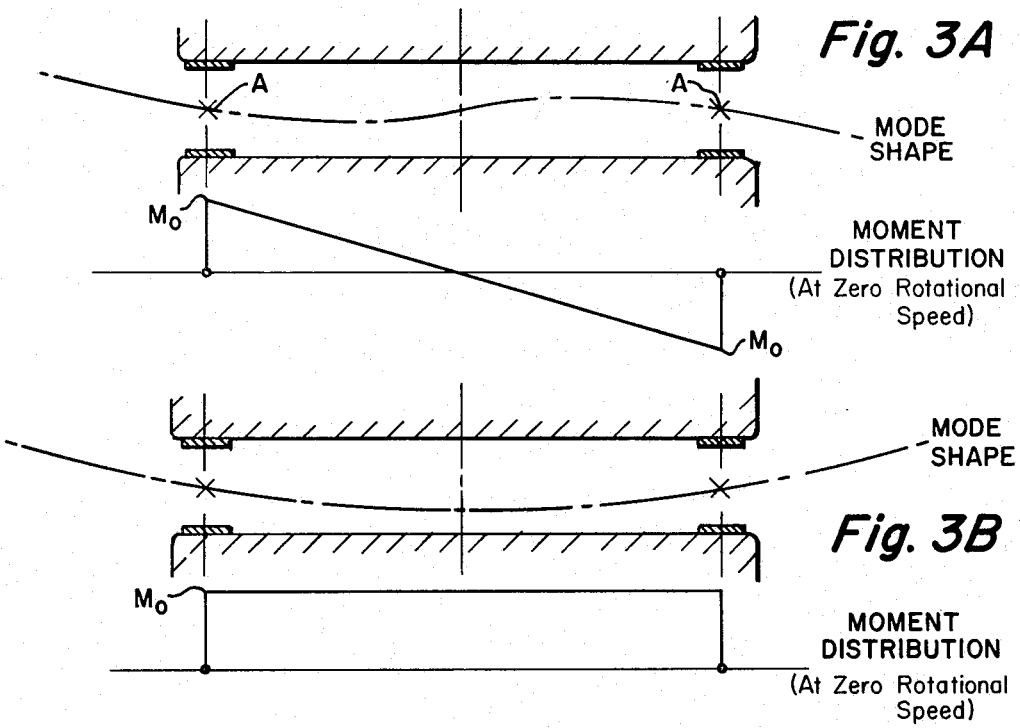
Fig. 3A
Fig. 3B
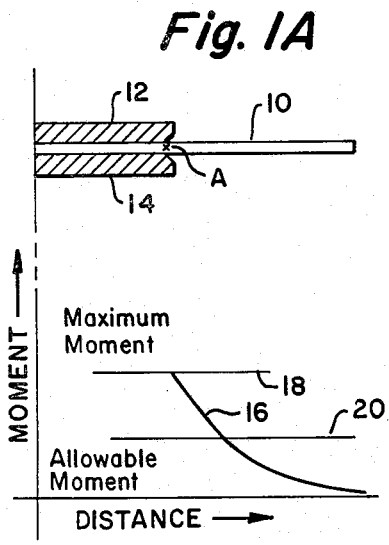
Fig. 1A
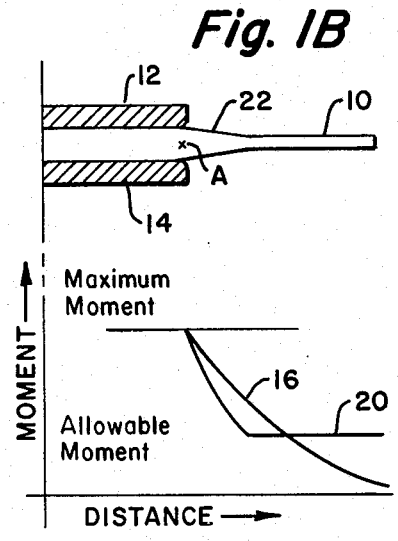
Fig. 1B
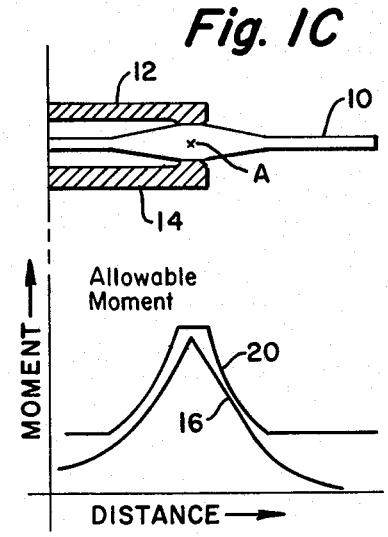
Fig. 1C

ROTARY HEAD ASSEMBLY FOR ROTARY WING AIRCRAFT

BACKGROUND OF THE INVENTION

In the design of rotor assemblies for rotary wing aircraft, susch as helicopters, it is desirable to eliminate pivots or bearings which require costly maintenance and represent potential safety hazards. To eliminate such problems, hingeless blade attachments have been developed. However, a hingeless arrangement may cause high hub moments and severe vibration. Teetered, gimbaled or articulated blades are, therefore, preferred. These configurations, however, require pivots or bearings. Bearings can be eliminated by utilizing flexible straps for connecting the rotor to the blades such that the strap can twist in response to lead-lag, bending and pitch movements. In this case, the strap root can be either clamped or attached pivotally to the hub. Cantilever attachment of this type requires so-called curved "shoes" for strap strain control. The radius of curvature of the shoe, R, is determined by the equation $1/R = M/EI$, where M is the moment defined by the allowable bending stresses in the flexing strap whose bending stiffness is EI.

There are two distinct disadvantages of the shoe-strap concept and these are: (1) the shoe significantly increases the weight of the rotor system, especially tail rotors, and (2) the rotating blade-strap system flapwise bending natural frequencies vary with coning angle as well as azimuth position.

SUMMARY OF THE INVENTION

The present invention eliminates the problems encountered with shoe-strap arrangements for rotary wing aircraft hub assemblies by providing for flexibility of the strap inside the hub in such a manner that the strap flapping root boundary is equivalent to a hinge coupled with an angular spring. This is accomplished in accordance with the invention by scalloping the hub to permit vertical motion of that portion of the strap within the hub itself, as well as the tailoring of the strap to achieve stress levels compatible with the strength of the material from which the strap is formed.

In accordance with the invention, a flexible, integral strap for rotary wing aircraft blade retention is provided which extends from the root end of one blade and through the rotary hub to the opposing blade, the strap being clamped at the outer edges of the hub and the strap spanwise contour within the hub boundaries being determined by the degree of flexibility required to fix the spanwise distribution. Preferably, the outer edges of the hub which engage the strap support it through a bearing pad or flexure formed from an elastomer. This elastomer provides flapwise angular motion compatibility at the support points, and also acts as a barrier against foreign object and moisture intrusion, preventing strap-hub damage. The fact that the strap ties two blades together permits the tuning of blade dynamic response in such a manner as to tailor the flap bending moment distribution in the critical region, this region being in the hub area.

The above and other objects and features of the invention will become apparent from the following detailed description taken in connection with the accompanying drawings which form a part of this specification, and in which:

FIGS. 1A, 1B and 1C are schematic illustrations illustrating the flapwise bending moment distribution along a flexible strap interconnecting rotary wing aircraft blades with and without the present invention;

FIG. 2 illustrates one embodiment of the invention wherein a flexible strap interconnecting rotor blade is held between spaced clamping members with the aid of an elastomer;

FIGS. 3A and 3B illustrate the mode shape and moment distribution along a flexible strap interconnecting rotor blades for two different bending conditions;

Figure 4:
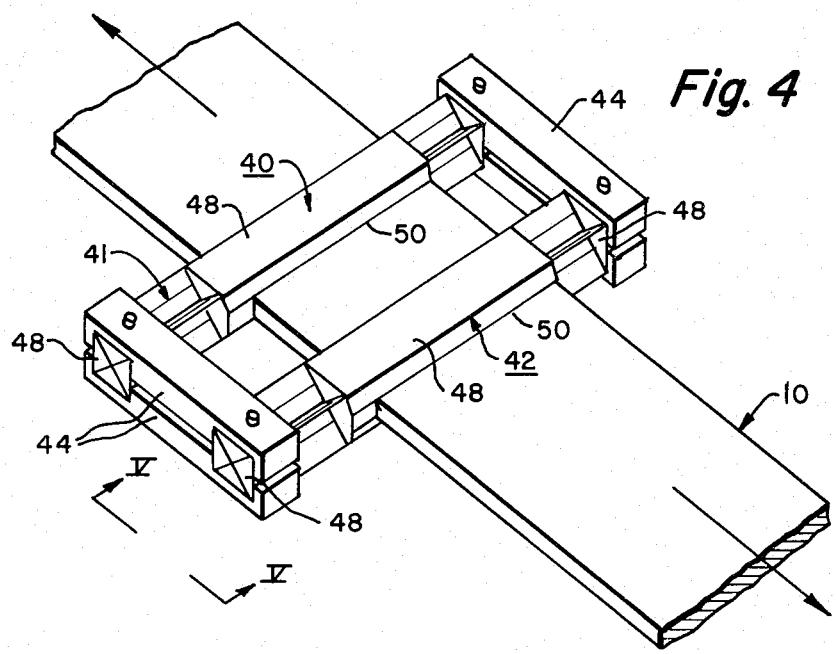
FIG. 4 illustrates a preferred form of the invention wherein a flexible strap interconnecting rotor blade passes through two spaced flexures.

With reference now to the drawings, and particularly to FIG. 1A, there is shown a flexible strap 10 which is intended to have a helicopter rotor blade or the like, not shown, connected to its right extremity. The other hand of the strap is sandwiched between a pair of hub plates 12 and 14 mounted on the rotor of a helicopter or other rotary wing aircraft. Strap 10 carries a second blade, not shown, at its other extremity on the other side of the hub plates 12 and 14. The curve in FIG. 1A and identified by the reference numeral 16 is a plot of the moment versus distance from the point A. Line 18 represents the maximum moment; while line 20 represents the allowable moment taking into account the effects of steady loads such as steady bending, steady twisting and centrifugal force loads. Note that the allowable moment can be easily exceeded, particularly near the connection of the strap to the hub plates.

In FIG. 1B, a modification of the arrangement of FIG. 1A is shown wherein an attempt is made to tailor the strap 10 by increasing its thickness in the area of plates 12 and 14 and tapering it as at 22. The curves or lines 16, 18 and 20 again indicate the actual, maximum and allowable moments. The increased stiffness in the tapered portion 22 increases the moment outboard of the tapered section. The end result is a bending moment distribution that is constantly one step ahead of the allowable moment distribution. In FIG. 1C, the arrangement of the present invention is shown wherein the blade 10 is clamped at the edge of the hub plates 12 and 14 and has tapered portions on either side of the point at which it is clamped between the plates 12 and 14. Note that in this case the allowable moment curve 20 is always above the actual moment curve 16.

With reference to FIG. 2, for the simple case of a two-bladed rotor system, the hub will consist of the upper and lower plates 12 and 14, the lower plate being connected to a driving shaft 24 for the rotor. The plates 12 and 14 have raised portions or flanges 26 at their opposite ends between which the blade 10 is clamped to provide a central scalloped or hollow portion 27. Preferably, the blade has enlarged portions 28 at the points where it is clamped, or between the flanges 26. Elastomeric pads 30 are preferably provided between the flanges 26 and the enlarged portions 28. Extensions 32 are provided on the lower plate 14 and are provided with elastomeric pads 34 to prevent excessive dropping of the blades 36 carried on the opposite ends of the integral strap 10.

The tailoring of the strap 10 between the flanges or bearing pads 26 is determined by the flexibility required for bending moment control just outboard of the pad. The effective spring rate at the pad location, due to the strap flexibility between the pads, will be dependent on the harmonic of loading under consideration. The first harmonic loading with one blade deflected downwardly and the other deflected upwardly produces an antisymmetrical mode of response as shown in FIG. 3A. The second harmonic loading with both blades deflected in the same direction produces a symmetrical mode of response as shown in FIG. 3B. In FIG. 3A, the first curve illustrates the mode shape while the second curve represents the moment distribution. The maximum moment $M_o$ occurs at the points A between the pads or flanges 26 and decreases to zero midway between the pads. The mode shape, on the other hand, is antisymmetrical about the center point. On the other hand, when both blades are deflected in the same direction, the mode shape is symmetrical about the center point while the moment distribution in constant between the pads or flanges 26. Since the predominant harmonic loading is that shown in FIG. 3A, the alternating flapwise bending moment near the pads 26 will be defined by the first harmonic loading, although the second harmonic will define the alternating moments at and near the center of rotation.

The flexibility incorporated into the strap permits large bending deflections under ground wind conditions. Consequently, the flap down or droop stops 34 are built into the lower hub plate 14 so that the blade strap bending deflections are limited under ground wind conditions to preclude striking the fuselage structure during the critical start-up and shut-down operations.

It can be seen, therefore, that by supporting the integral flexible strap which interconnects two blades 36 by means of spaced support devices, bending in the integral strap between the spaced support devices permits higher loads on the blades without exceeding the permissible moment distribution for the strap outboard of the hub structure.

Figure 5A:
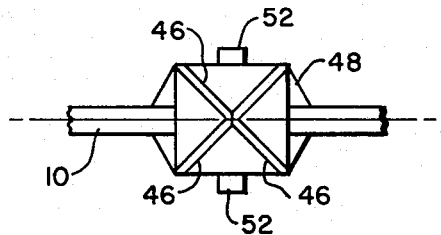
FIGS. 5A and 5B are end views taken along line V—V of FIG. 4 and illustrating the construction of the flexures used in the embodiment of FIG. 4.
Figure 5B:
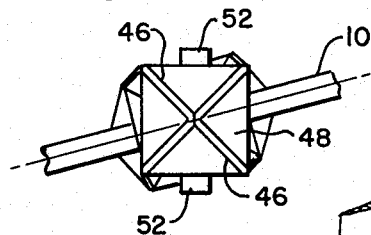

The preferred embodiment of the invention is shown in FIGS. 4, 5A and 5B. In this case, the flexible strap 10 extends between two flexures 40 and 42 which are interconnected at their ends by means of bars 44, if dynamic response characteristic requirements dictate that additional end rigidity is required. As best shown in FIG. 5A, each flexure comprises four strips 46 of cross-plied fiberglass reinforced plastic laid up at $\pm 15°$ for high bending strength and low torsional stiffness. They are bonded together to form an X configuration in cross section. The central portion of the X is reinforced with a $\pm 45°$ layup to resist VQ/I shears 41. Those portions of the torsion flexure 40 or 42 which connected with the strap 10 and with the hub, via the attachment pins 52, are filled in which an epoxy - chopped fiber material 48, providing the required shear or bearing connections. The strap 10 itself extends through slots 50 provided in the flexures 40 and 42. Pins 52 are embedded in the epoxy filling at each end of the flexures 40 and 42 for connection of the flexures 40 and 42 to the hub plates.

When as shown in FIG. 5B, the strap 10 is subjected to flapwise bending loads, the torsion flexure 40 or 42 permits rotation of the strap about the longitudinal axis of the flexure. That portion of the strap 10 extending inboard through the other flexure and to the other blade, being loaded under blade centrifugal forces, acts as a spring about the flexure's torsional axis. Thus, the overall effect is to provide the strap 10 with a flap hinge in conjunction with a rotary spring, a strap root restraint which is between a full cantilever and a simple hinge, but tending toward the hinge.

Figure 6:
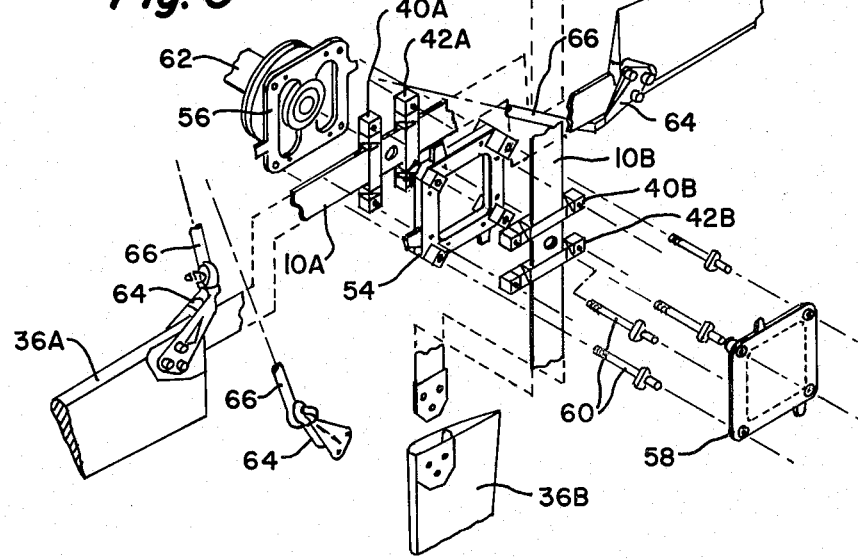
FIG. 6 is an exploded view of the preferred embodiment of the invention as applied to a helicopter tail rotor.

A completed tail rotor assembly incorporating the invention is shown in FIG. 6. It includes two sets of blades 36A and 36B interconnected by means of an associated flexible strap 10A or 10B. There are two sets of spaced torsional flexures 40A, 40B, 42A and 42B for the respective flexible straps 10A and 10B. An adapter plate 54 is interposed between the two sets of flexures and serves as a common hub attachment plate for the pair of straps. The assembly is secured between a first hub plate 56 and a second or outer hub plate 58 by means of bolts 60 which extend through holes in the respective elements forming the assembly. The inner hub plate 56 is connected to a driving shaft 62. Pitch arms 64 for the blades are connected through pitch arm linkages 66 to a swash plate assembly, not shown, in accordance with usual practice.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A rotor head assembly for rotary wing aircraft comprising a rotor hub, a pair of blades disposed on opposite sides of said hub, integral flexible strap means interconnecting said blades, and strap mounting means connecting said strap means to said hub intermediate said blades, said mounting means comprising a pair of elongated devices extending transverse to the longitudinal axes of said blades at spaced points along said strap means for securing said strap means to the hub while permitting flexing of the strap means intermediate the elongated devices.

2. The assembly of claim 1 wherein said elongated devices comprise clamping pads on opposite sides of said strap means, and means for drawing said clamping pads together to clamp the strap means to the hub at spaced points.

3. The assembly of claim 2 wherein two of said clamping pads are carried at spaced points on one hub plate while the remaining two clamping pads are carried on a second hub plate, the clamping pads being formed by flanges at the ends of the hub plates with the area intermediate the flanges being of reduced cross-sectional area to permit flexing of the strap means between the clamping pads.

4. The assembly of claim 1 wherein each of said elongated devices has a degree of torsional flexibility about an axis transverse to said longitudinal axes of the blades which permits each device and the strap mounted thereon to twist about said transverse axis.

5. The assembly of claim 4 wherein each of said elongated devices is formed from fiberglass fibers embedded in an epoxy.

6. The assembly of claim 4 wherein each of said elongated devices is formed from strip members forming an X-shaped cross-sectional configuration, and an epoxy material filling the cavities formed by the X-shaped configuration at their ends and in the area of their connection to said flexible strap means.

7. A rotor head assembly for rotary wing aircraft comprising a rotor hub, at least one pair of blades disposed on opposite sides of said hub, integral flexible strap means interconnecting said blades, and strap mounting means connecting said strap means to said hub intermediate said blades, said mounting means comprising a pair of elongated devices formed from strip members forming an X-shaped cross-sectional configuration, and an epoxy material filling the cavities formed by the X-shaped configuration at their ends and in the area of their connection to said flexible strap means, wherein said elongated devices extend transverse to the longitudinal axis of said blades at spaced points along said strap means for securing said strap means to one hub while permitting flexing of the strap means intermediate to the elongated devices, and wherein each of said elongated devices has a degree of torsional flexibility about an axis transverse to said longitudinal axis of said blade which permits each device and the strap mounted thereon to twist about said transverse axis.

* * * * *